（12) United States Patent
Koshikawa

(10) Patent No.: US 7,477,293 B2
(45) Date of Patent: Jan. 13, 2009

(54) REMOTE-CONTROL DEVICE FOR DIGITAL CAMERA

(75) Inventor: Naoki Koshikawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 733 days.

(21) Appl. No.: 11/035,963

(22) Filed: Jan. 18, 2005

(65) Prior Publication Data

US 2005/0162524 A1 Jul. 28, 2005

(30) Foreign Application Priority Data

Jan. 26, 2004 (JP) ............................ P2004-016937

(51) Int. Cl.
*H04N 5/225* (2006.01)
*H04N 9/04* (2006.01)
*H04N 5/232* (2006.01)
(52) U.S. Cl. ............................ 348/211.99; 348/207.99; 348/207.1; 348/207.11
(58) Field of Classification Search ............... 348/211.8, 348/207.11, 211.99
See application file for complete search history.

(56) References Cited

U.S. PATENT DOCUMENTS

| 5,469,211 | A | * | 11/1995 | Maruichi et al. | ......... 348/211.2 |
| 5,655,163 | A | * | 8/1997 | Tsukahara et al. | .......... 396/287 |
| 5,659,807 | A | * | 8/1997 | Nakamura et al. | ............. 396/55 |
| 6,256,060 | B1 | * | 7/2001 | Wakui | ...................... 348/211.2 |
| 6,809,759 | B1 | * | 10/2004 | Chiang | ..................... 348/211.2 |
| 7,012,636 | B2 | * | 3/2006 | Hatanaka | ................. 348/211.99 |
| 7,046,291 | B2 | * | 5/2006 | Saito | ............................ 348/367 |
| 7,340,766 | B2 | * | 3/2008 | Nagao et al. | ................. 725/105 |
| 2003/0193576 | A1 | * | 10/2003 | Fujii | ......................... 348/211.8 |
| 2005/0068423 | A1 | * | 3/2005 | Bear et al. | .............. 348/207.99 |

FOREIGN PATENT DOCUMENTS

JP 2002-094867 3/2002

* cited by examiner

*Primary Examiner*—Tuan Ho
*Assistant Examiner*—Pritham Prabhakher
(74) *Attorney, Agent, or Firm*—Greenblum & Bernstein, P.L.C.

(57) ABSTRACT

A remote-control device controls a digital camera, to make the digital camera perform a particular photographing operation having a continuous photographing operation or a bulb photographing operation. The remote-control device may be a personal computer. A start-command generating processor generates a start-command for starting the particular photographing operation, by depressing a switch, which may be a button of a mouse for the personal computer. An end-command generating processor generates an end-command for ending the particular photographing operation, by releasing the switch.

3 Claims, 6 Drawing Sheets

REMOTE-CONTROL DEVICE FOR DIGITAL CAMERA

BACKGROUND OF THE INVENTION

1. Field of the Invention

The present invention relates to a remote-control device for a digital camera, in which the remote-control is performed by a personal computer.

2. Description of the Related Art

Conventionally, a system for the remote-control of a digital camera through a personal computer, has been proposed as described in Japanese Unexamined Patent Publication No. 2002-94867. Further, there is known a digital camera, which can be remote-controlled through a personal computer.

A continuous photographing operation and a bulb photographing operation, however, are carried out by continuously depressing a shutter button of a digital camera, and therefore, they cannot be performed by a remote-control using a personal computer, or by operating the keyboard or mouse thereof.

SUMMARY OF THE INVENTION

Therefore, an object of the present invention is to provide a remote-control device for a digital camera using a personal computer and so on, in which a particular photographing operation such as a continuous photographing operation and a bulb photographing operation can be performed.

According to the present invention, there is provided a remote-device for making a digital camera perform a particular photographing operation having at least one of a continuous photographing operation and a bulb photographing operation. The remote-control device comprises a start-command generating processor, and an end-command generating processor.

The start-command generating processor generates a start-command for starting the particular photographing operation, by depressing a switch. The end-command generating processor generates an end-command for ending the particular photographing operation, by releasing the switch.

Further, according to the present invention, there is provided a remote-control system comprising a digital camera, a start-command transmitting processor, and an end-command generating processor.

The digital camera can perform a particular photographing operation having at least one of a continuous photographing operation and a bulb photographing operation. The start-command transmitting processor is provided in a computer, which is independent from the digital camera. The start-command transmitting processor generates a start-command for starting the particular photographing operation, by depressing a switch. The end-command generating processor is provided in the computer. The end-command generating processor generates an end-command for ending the particular photographing operation, by releasing the switch.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
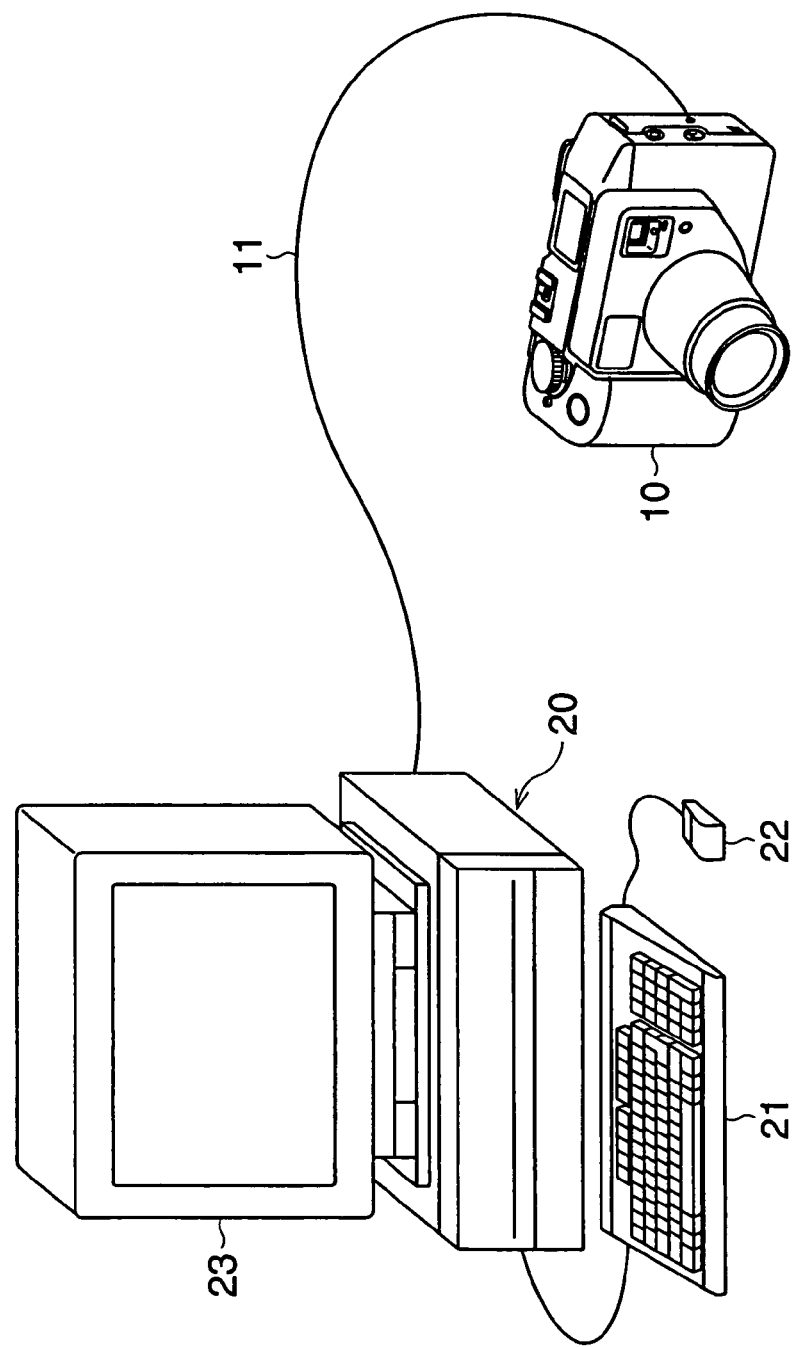
FIG. 1 is a perspective view showing a state, in which a digital camera is connected to a remote-control device (or a personal computer) which is an embodiment of the present invention.

The present invention will be described below with reference to the embodiment shown in the drawings.

FIG. 1 shows a remote-control system of a digital camera to which an embodiment of the present invention is applied. In this remote-control system, the digital camera 10 is connected to the personal computer 20 through a cable 11. The digital camera 10 can be used individually or separately, and when connected to the personal computer 20, the digital camera 10 can be remote-controlled through the personal computer 20. In the personal computer 20, a control data for the digital camera 10 is input through a keyboard 21 and a mouse 22, and is indicated by a display 23.

Figure 2:
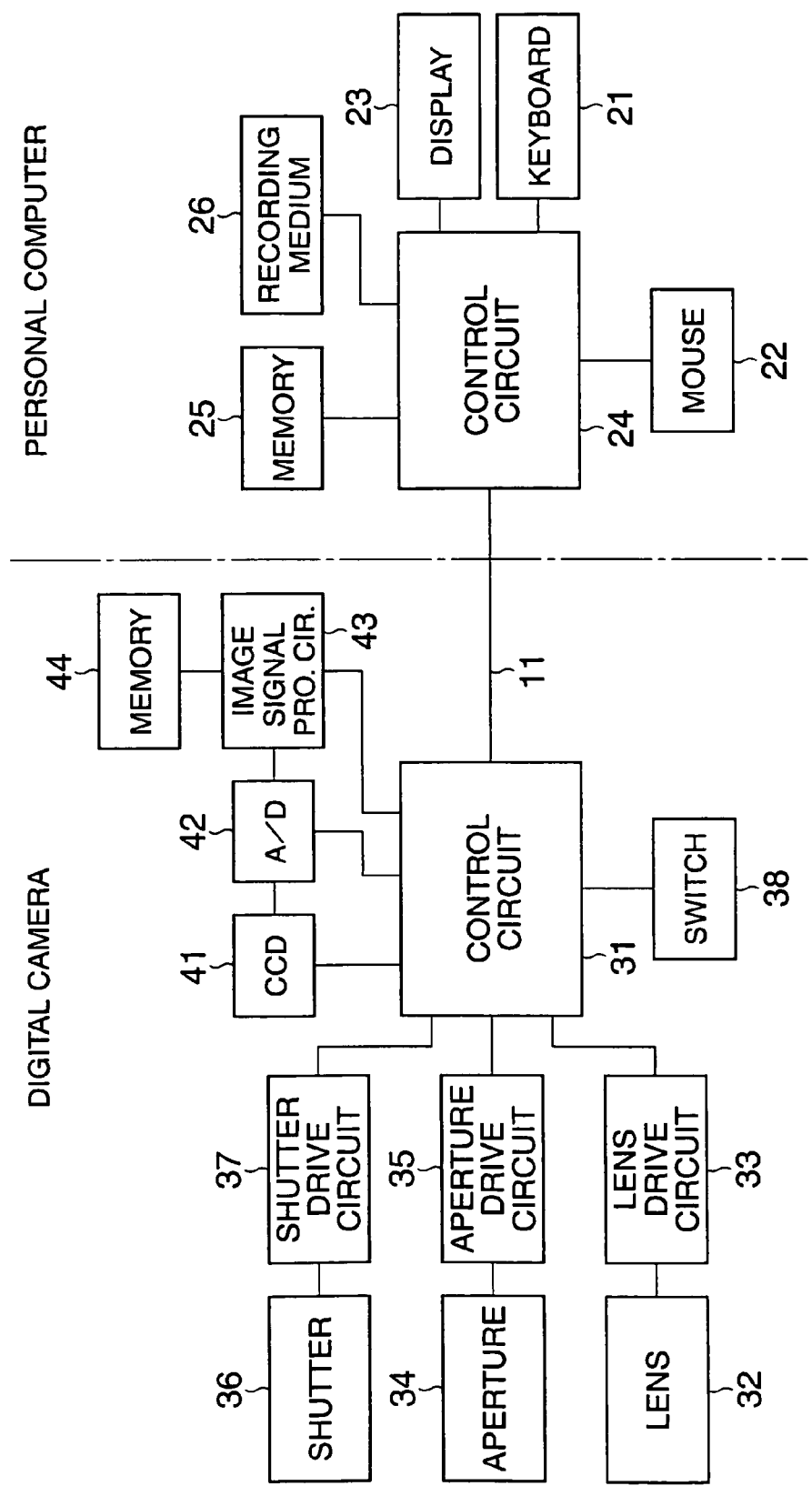
FIG. 2 is a block diagram generally showing an electric construction of the digital camera and the personal computer.

FIG. 2 is a block diagram generally showing an electric construction of the digital camera 10 and the personal computer 20. In the personal computer 20, the keyboard 21, the mouse 22, the display 23, a memory 25, and a recording medium 26 such as PC-card are connected to a control circuit 24, which contains a CPU and so on. Image data, transmitted from the digital camera 10, is temporally stored in the memory 25, and is recorded in the recording medium 26 after being subjected to predetermined processes.

In the digital camera 10, the control circuit 31 is connected to the control circuit 24 of the personal computer 20 through the cable 11. A lens drive circuit 33 for controlling a focusing operation and a zooming operation of the lens 32, an aperture drive circuit 35 for adjusting the opening degree of the aperture 34, and a shutter drive circuit 37 for opening and closing the shutter 36, are connected to the control circuit 31. Further, a switch 38 including a release switch and so on is connected to the control circuit 31.

Light passing through the lens 32, the aperture 34, and the shutter 36, is made incident on an imaging device (i.e., CCD) 41, so that a subject image is formed. An analogue image signal read out from the CCD 41 is converted to digital image data in an AD converter 42. The image data is subjected to predetermined processes in an image signal processing circuit 43, and is temporally stored in a memory 44. The CCD 41, the AD converter 42, and the image signal processing circuit 43 are controlled by the control circuit 31.

In the embodiment, as one of photographing modes, a particular photographing operation having a continuous photographing operation and a bulb photographing operation can be performed by the digital camera 10. The continuous photographing operation can be performed in a remote-control operation, using the personal computer 20, which is separately provided from the digital camera 10.

A program, by which the remote-control operation is executed, is recorded in a recording medium, which may be the recording medium 26, a CD-ROM, or a DVD, for example. The program is read from the recording medium by the personal computer 20, before performing the remote-control operation.

Figure 3:
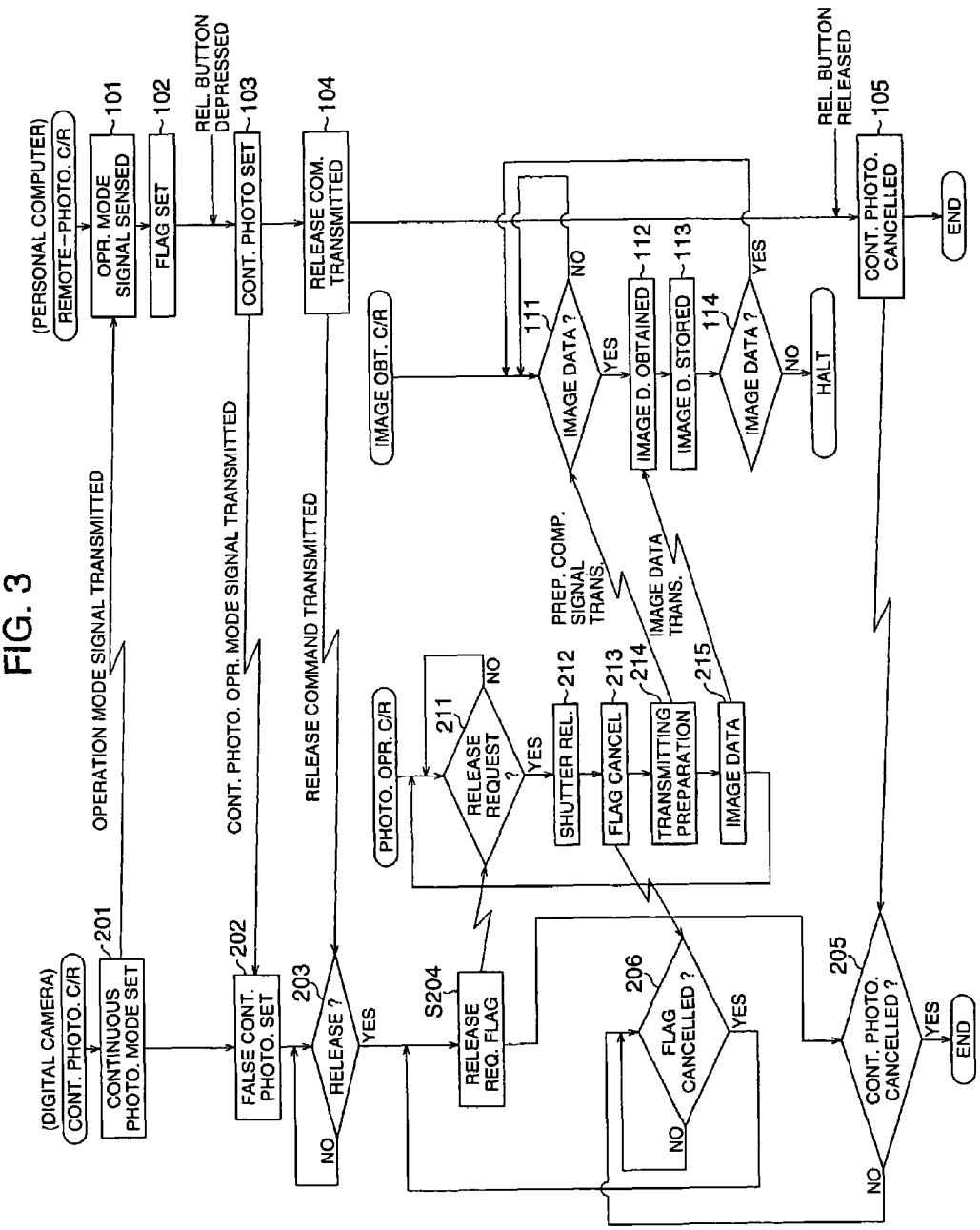
FIG. 3 is a flowchart showing a control of a continuous photographing operation in the digital camera and the personal computer.

With reference to FIG. 3, a continuous photographing operation will be described below.

FIG. 3 is a flowchart showing a control of a continuous photographing operation by the digital camera 10 and the personal computer 20. In the digital camera 10, a continuous photographing operation control routine and a photographing process control routine are executed, and in the personal computer 20, a remote photographing operation control routine and an image obtaining operation control routine are executed.

An operation mode of the continuous photographing operation is set by operating the switch 38 of the digital camera 10. Due to this, in Step 201 of the continuous photographing operation control routine, an operation-mode signal indicating a continuous photographing operation is generated, and transmitted to the personal computer 20.

In Step 101 of the remote photographing operation control routine, the operation mode signal transmitted from the digital camera 10 is sensed. In Step 102, an operation mode flag is set to "continuous photographing operation".

Figure 4:
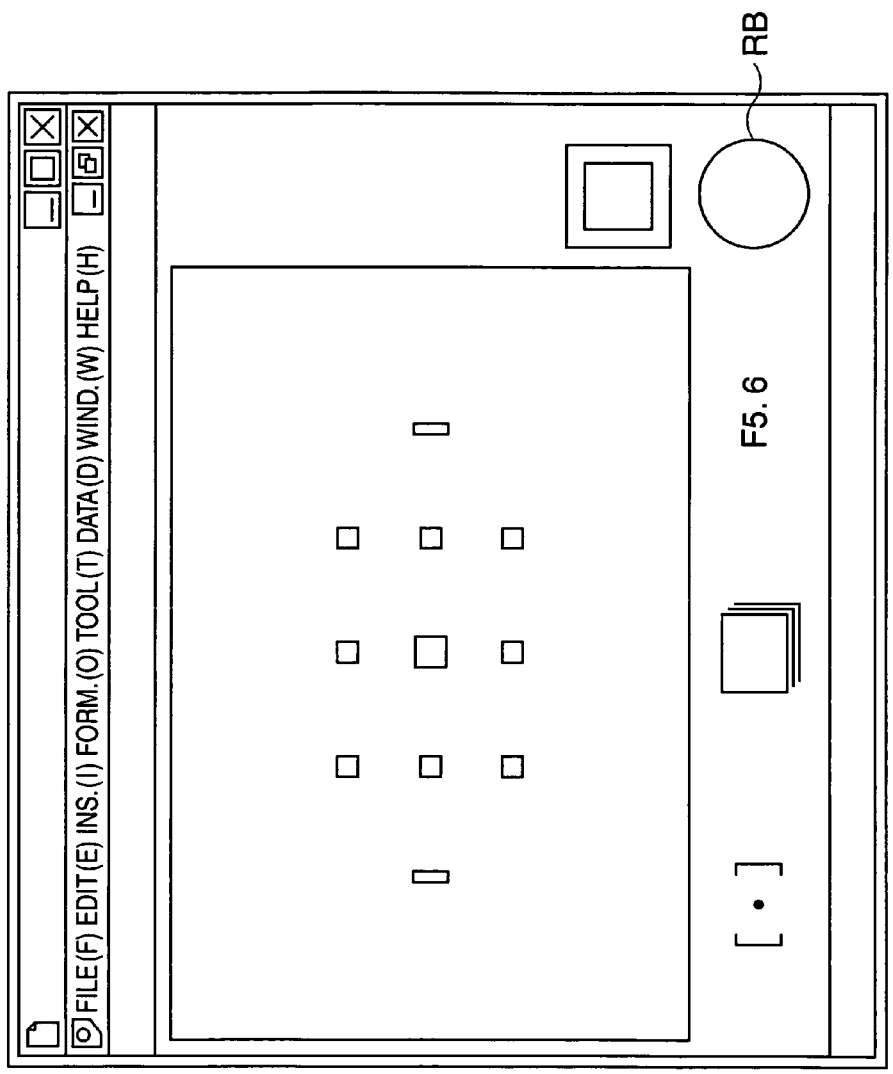
FIG. 4 is an example of a release button indicated on a display.

The remote photographing operation control routine halts under this state, and when a release button RB (see FIG. 4) indicated on the display 23 is virtually depressed by depressing a button of the mouse 22, Step 103 is executed, in which a continuous photographing operation set command (i.e., a start-command) for starting a continuous photographing operation is generated, and transmitted to the digital camera 10. In Step 104, a release command is transmitted to the digital camera 10. Note that FIG. 4 shows an example of the release button RB indicated on the display 23, in which the release button RB is indicated at the bottom-right of the frame, which imitates a viewfinder of the digital camera 10.

In the remote photographing operation control routine of the digital camera 10, when the continuous photographing operation set command is received, Step 202 is executed, in which a false continuous photographing operation condition is set, and the continuous photographing operation control routine is set to a halt condition. In Step 203, it is checked whether the release command has been input. When the release command transmitted from the personal computer is input, the process goes to Step 204, in which a release request flag is set in order to perform a continuous photographing operation.

Figure 5:
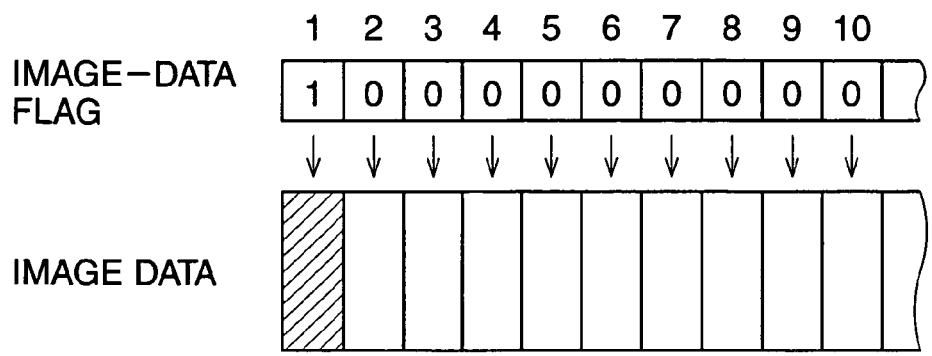
FIG. 5 is a view showing an image-data flag and its corresponding image data, which is stored in a memory.

In Step 211 of the photographing process control routine, it is determined whether the release request flag has been set. If the release request flag has been set, Step 212 is executed, so that a shutter release is performed to carry out a photographing operation. When the photographing operation for one picture is completed, the release request flag is cancelled in Step 213. In Step 214, a preparation completion signal, indicating that preparation for transmission of image data has been completed, is generated, and transmitted to the personal computer 20. Further, in Step 214, an image data flag is set, and the image data is stored in the memory 44. FIG. 5 shows a state in which, regarding the image taken in the first time, the image data flag is set, and the image data is stored in the memory 44.

In Step 215, the image data is read from the memory 44, and transmitted to the personal computer 20. When the transmission of the image data is completed, the image data flag is cancelled.

In the continuous photographing operation control routine, after Step 204, Step 205 is executed, in which it is determined whether the continuous photographing operation condition has been cancelled. As is described later, the continuous photographing operation condition is not cancelled until the depressed button of the mouse 22 is released to release the release button RB in the personal computer 20. Here, if it is supposed that the continuous photographing operation condition is continued, the process goes from Step 205 to Step 206.

In Step 206, it is determined whether the release request flag has been cancelled. The release request flag is cancelled in Step 213 when a photographing operation for one image is completed, as described above. When the release request flag is not cancelled, Step 206 is repeatedly executed, and when the release request flag is cancelled, the process goes from Step 206 to Step 204.

In Step 204, the release request flag is set again, so that the operations described above are performed, to carry out a photographing operation for the second image.

Figure 6:
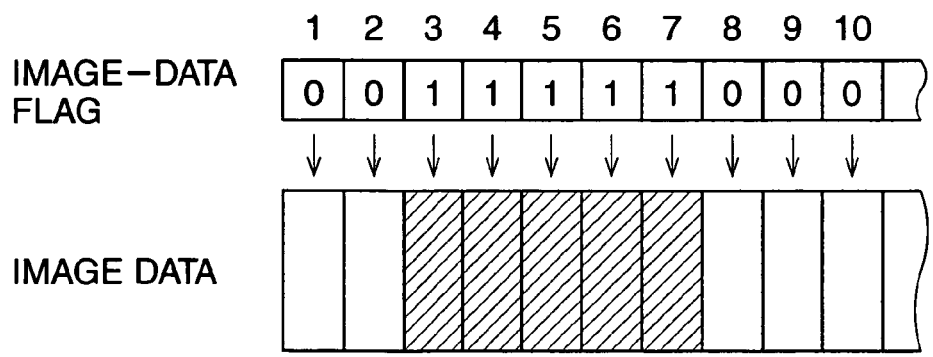
FIG. 6 is a view showing five pairs of image-data flags and their corresponding image data, which are stored in the memory.

While the photographing operation is carried out, the image data is transmitted from the digital camera 10 to the personal computer 20 in Step 215, and in most cases, the transmittance of the image data takes a longer time than the photographing operation. Therefore, usually, during a continuous photographing operation, several pairs of image-data flags and its corresponding image data are accumulated in the memory 44. FIG. 6 shows an example in which the first and second image data have been transmitted to the personal computer 20, and the third through seventh image data have not been transmitted to the personal computer 20.

In the personal computer 20, the remote photographing operation control routine and the image obtaining operation control routine are actuated, and in Step 111 of the image obtaining operation control routine, it is determined whether the image data can be obtained by the personal computer 20. When the preparation completion signal, transmitted from the digital camera 10, is sensed, it is judged in Step 111 that image data can be obtained, so that Step 112 is executed, in which the image data is obtained by the personal computer 20. This image data is stored in the memory 25 in Step 113.

Note that, an image, corresponding to the image data obtained in Step 112, can be indicated on the display 23 when required. Due to this, the number of frames in the continuous photographing operation and the images can be confirmed. Further, only the image data flags can be transferred before the corresponding image data are transferred, to indicate on the display 23 the number of images that have been taken in the continuous photographing operation.

In Step 114, the memory 44 of the digital camera 10 is checked for an image data flags, so that it can be determined whether any image data, which has not been received, exists. When there is an image data flag, which is set, the process goes back to Step 111, the operations described above are again executed. Conversely, when all the image data flags have been cancelled, the image obtaining operation control routine is set to a holding condition, and Step 111 is repeatedly executed so that the personal computer 20 can sense the preparation completion signal.

On the other hand, after the release command is output in Step 104, the remote photographing operation control routine halts, and when the release button RB is released by releasing the button of the mouse 22, Step 105 is executed, in which a continuous photographing operation cancel command (i.e., an end-command) for ending a continuous photographing operation is generated. The continuous photographing operation cancel command is transmitted to the digital camera 10, and the remote photographing operation control routine ends with the execution of Step 105.

In Step 205 of the continuous photographing operation control routine, by receiving the continuous photographing operation cancel command, it is judged that the continuous photographing operation condition is cancelled, and the continuous photographing operation control routine ends. Note that, if the release request flag has already been set, the flag is immediately reset.

According to the control operation of the continuous photographing operation, shown in FIG. 3, while the button of the mouse 22 is depressed for the personal computer 20, a continuous photographing operation is carried out in the digital camera 10. Namely, by an operation, in which the button of the mouse 22 is depressed and released, photographing operations are continuously performed to carry out a continuous photographing operation in the digital camera 10, for a period from receiving the continuous photographing operation set command (i.e., the start-command) to receiving the continuous photographing operation cancel command (i.e., the end-command).

Figure 7:
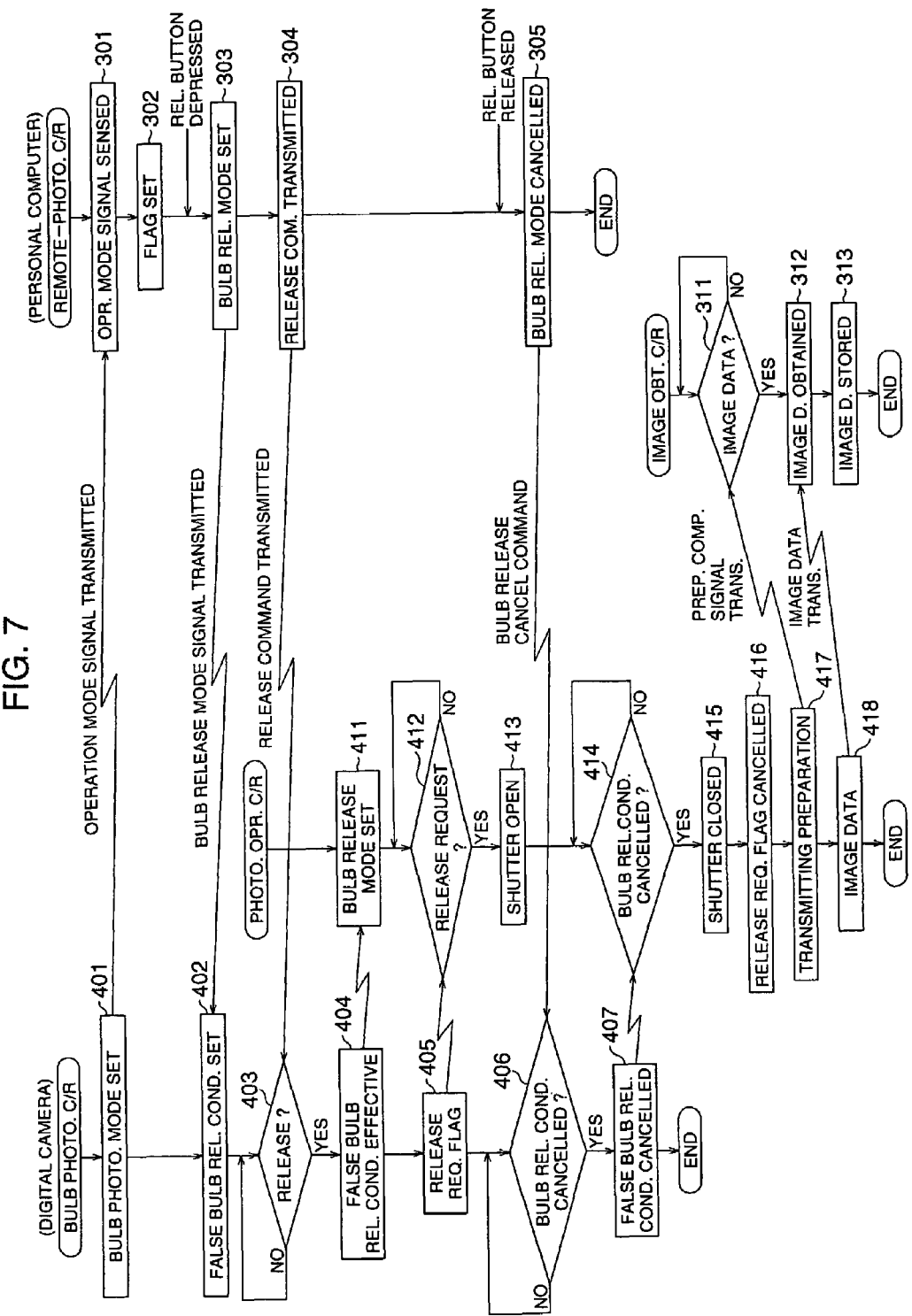
FIG. 7 is a flowchart showing a control of a bulb photographing operation in the digital camera and the personal computer.

FIG. 7 is a flowchart showing a control of a bulb photographing operation by the digital camera 10 and the personal computer 20. In the digital camera 10, a bulb photographing operation control routine and a photographing process control routine are executed, and in the personal computer 20, a remote photographing operation control routine and an image obtaining operation control routine are executed.

First, an operation mode of the bulb photographing operation is set by operating the switch 38 of the digital camera 10. Due to this, in Step 401 of the bulb photographing operation control routine, an operation mode signal indicating the bulb photographing operation is generated, and transmitted to the personal computer 20.

In Step 301 of the remote photographing operation control routine, the operation mode signal transmitted from the digital camera 10 is sensed. In Step 302, an operation mode flag is set to "bulb photographing operation".

The remote photographing operation control routine halts under this state, and when a release button RB indicated on the display 23 is virtually depressed by depressing a button of the mouse 22, Step 303 is executed, in which a bulb release mode set command (i.e., a start-command) for starting a bulb photographing operation is generated, and transmitted to the digital camera 10. In Step 304, a release command is transmitted to the digital camera 10, and the remote photographing operation control routine halts.

In the bulb photographing operation control routine of the digital camera 10, when the bulb-release-mode set command is received, Step 402 is executed, in which a false bulb release condition is set, and the bulb photographing operation control routine is set to a halt condition. In Step 403, it is checked whether the release command has been input. When the release command is input, the process goes to Step 404, in which a false bulb release condition is made effective in order to perform a bulb photographing operation. Step 405 is then executed, in which a release request flag is set.

On the other hand, in Step 411 of the photographing process control routine, a bulb release mode is set, and in Step 412, it is determined whether the release request flag has been set. If the release request flag has been set, Step 413 is executed, in which the shutter 36 is open. In Step 414, it is determined whether the bulb release mode has been cancelled. If the false bulb release condition is not cancelled, Step 414 is repeatedly executed, so that the shutter 36 is kept open.

In the remote photographing operation control routine, which is set to the bulb release mode, when the release button RB is released by releasing the button of the mouse 22, Step 305 is executed, in which a bulb release cancel command (i.e., an end-command) for ending a bulb photographing operation is generated, and is transmitted to the digital camera 10. In the bulb photographing operation control routine, Step 406 is repeatedly executed, so that it is determined whether the bulb release condition has been cancelled. When the bulb release cancel command is received, Step 407 is executed, in which the false bulb release condition is cancelled, and the bulb photographing operation control routine ends.

When the false release condition is cancelled, in the photographing process control routine, the process goes from Step 414 to Step 415, so that the shutter is closed. In Step 416, the release request flag is then cancelled, and in Step 417, a preparation completion signal, indicating that the preparations for transmitting image data have been completed, is generated, and transmitted to the personal computer 20. Further, in Step 418, the image data is transmitted to the personal computer 20. When the transmission of the image data is completed, the photographing process control routine ends.

In the personal computer 20, the remote photographing operation control routine and the image obtaining operation control routine are actuated, and in Step 311 of the image obtaining operation control routine, it is determined whether image data can be obtained by the personal computer 20. When the preparation completion signal, transmitted from the digital camera 10, is sensed, the process goes from Step 311 to Step 312, in which the image data is obtained by the personal computer 20. This image data is stored in the memory 25 in Step 313, and the image obtaining operation control routine ends.

According to the control operation of the bulb photographing operation, shown in FIG. 7, while the button of the mouse 22 is depressed in the personal computer 20, a bulb photographing operation is carried out in the digital camera 10. Thus, a particular photographing operation such as a bulb photographing operation, which could not be performed in the prior art, becomes possible with a personal computer 20.

In the embodiment, by keeping the release button RB indicated on the display 23 depressed, using the button of the mouse 22, the continuous photographing operation or the bulb photographing operation is performed. However, the particular photographing operation may be performed by keeping only the button of the mouse 22 depressed. Further, it is also possible that the mouse 22 is clicked once to depress the release button RB to start the particular photographing operation, and is then clicked again to release the release button RB to end the particular photographing operation.

Further, in Step 114 of the continuous photographing operation, the memory 44 of the digital camera 10 is accessed, so that it is confirmed whether non-received image data exists. However, instead of this, it is possible to record the image data flag in the personal computer 20, and refer to the image data flag in order to confirm the existence of the non-received image data.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-016937 (filed on Jan. 26, 2004) which is expressly incorporated herein, by reference, in its entirety.

The invention claimed is:

1. A remote-control system, comprising:
   a digital camera that performs at least one of a continuous photographing operation and a bulb photographing operation;

a setting processor which sets photographing modes for the continuous photographing operation and the bulb photographing operation;

a start-command transmitting processor that is provided in a computer, which is independent from said digital camera, said start-command transmitting processor generating a start-command for starting one of said continuous photographing operation and the bulb photographing operation when a switch is depressed; and an end-command generating processor that is provided in said computer, said end-command generating processor generating an end-command for ending the started one of said continuous photographing operation and the bulb photographing operation when said switch is released, wherein, in the mode for the continuous photographing operation, the continuous photographing operation is started when the switch is depressed, and the continuous photographing operation is ended when the switch is released, and wherein, in the mode for the bulb photographing operation, a shutter is opened when the switch is depressed, and the shutter is closed when the switch is released.

2. A remote-control system according to claim 1, wherein said digital camera continuously performs said continuous photographing operation for a period from receiving said start-command to receiving said end-command.

3. A remote-control system according to claim 1, wherein said switch is provided on a mouse for said computer.

\* \* \* \* \*